(12) United States Patent
Vermeulen et al.

(10) Patent No.: US 8,903,938 B2
(45) Date of Patent: Dec. 2, 2014

(54) PROVIDING ENHANCED DATA RETRIEVAL FROM REMOTE LOCATIONS

(75) Inventors: Allan H. Vermeulen, Seattle, WA (US); Luis Felipe Cabrera, Bellevue, WA (US); Peter N. DeSantis, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 1916 days.

(21) Appl. No.: 11/764,763

(22) Filed: Jun. 18, 2007

(65) Prior Publication Data

US 2008/0313318 A1 Dec. 18, 2008

(51) Int. Cl.
*G06F 15/16* (2006.01)
*G06F 9/455* (2006.01)

(52) U.S. Cl.
CPC ................ *G06F 9/45533* (2013.01)
USPC ........... 709/217; 709/201; 709/202; 709/203; 709/219

(58) Field of Classification Search
USPC ........................ 709/217, 201, 203, 202, 219
See application file for complete search history.

(56) References Cited

U.S. PATENT DOCUMENTS

| 5,991,810 | A | * | 11/1999 | Shapiro et al. | 709/229 |
| 6,411,967 | B1 | | 6/2002 | Van Renesse | 707/201 |
| 6,529,953 | B1 | | 3/2003 | Van Renesse | 709/223 |
| 6,724,770 | B1 | | 4/2004 | Van Renesse | 370/432 |
| 7,681,229 | B1 | * | 3/2010 | Ebrahimi et al. | 726/4 |
| 2002/0157019 | A1 | * | 10/2002 | Kadyk et al. | 713/201 |
| 2003/0058277 | A1 | * | 3/2003 | Bowman-Amuah | 345/765 |
| 2003/0061387 | A1 | * | 3/2003 | Brown et al. | 709/246 |
| 2006/0010295 | A1 | * | 1/2006 | Franaszek et al. | 711/138 |
| 2007/0064943 | A1 | * | 3/2007 | Ginter et al. | 380/233 |

FOREIGN PATENT DOCUMENTS

| EP | 1583316 A1 | 10/2005 |
| EP | 1701259 A2 | 9/2006 |

OTHER PUBLICATIONS

"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved May 3, 2006, from http://www.eweek.com/article2/0,1895,1772626,00.asp, 5 pages.

(Continued)

*Primary Examiner* — Lan-Dai T Truong
(74) *Attorney, Agent, or Firm* — Seed IP Law Group PLLC

(57) ABSTRACT

Techniques are described for providing client computing nodes with enhanced access to data from remote locations, such as by providing and using local capabilities specific to the remote locations. In at least some situations, the access of a client computing node to data from a remote location may be enhanced by automatically performing activities local to the client computing node that improve the efficiency of communications sent between the client computing node and the remote location. As one example, access to data from a remote service may be enhanced by locally performing activities specific to the remote service, such as by using information about the remote service's internal mechanisms to cause the desired data to be provided from internal storage devices of the remote service without passing through front-end or other intermediate devices of the remote service while traveling to the client computing node.

34 Claims, 5 Drawing Sheets

(56) References Cited

OTHER PUBLICATIONS

"Scalable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

"The Softricity Desktop," Softricity, retrieved May 3, 2006, from http://www.softricity.com/products/, 3 pages.

Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Coulson, D., "Network Security Iptables," Mar. 2003, Linuxpro, Part 1, retrieved from http://davidcoulson.net/writing/lxf/38/iptables.pdf, 4 pages.

Coulson, D., "Network Security Iptables," Apr. 2003, Linuxpro, Part 2, retrieved from http://davidcoulson.net/writing/lxf/39/iptables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Gruener, J., "A vision of togetherness," May 24, 2004, NetworkWorld, retrieved May 3, 2006, from, http://www.networkworld.com/supp/2004/ndc3/0524virt.html, 9 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Shankland, S., "Sun to buy start-up to bolster N1," Jul. 30, 2003, CNet News.com, retrieved May 3, 2006, http://news.zdnet.com/2100-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron®, retrieved May 3, 2006, from http://www.virtualiron.com/, 1 page.

Waldspurger, C.A., "Spawn: A Distributed Computational Economy," Feb. 1992, IEEE Transactions on Software Engineering, 18(2):103-117, 15 pages.

Bond, G. W., et al., "An Open Architecture for Next-Generation Telecommunication Services," ACM Transactions on Internet Technology, vol. 4, No. 1, Feb. 2004, pp. 83-123.

* cited by examiner

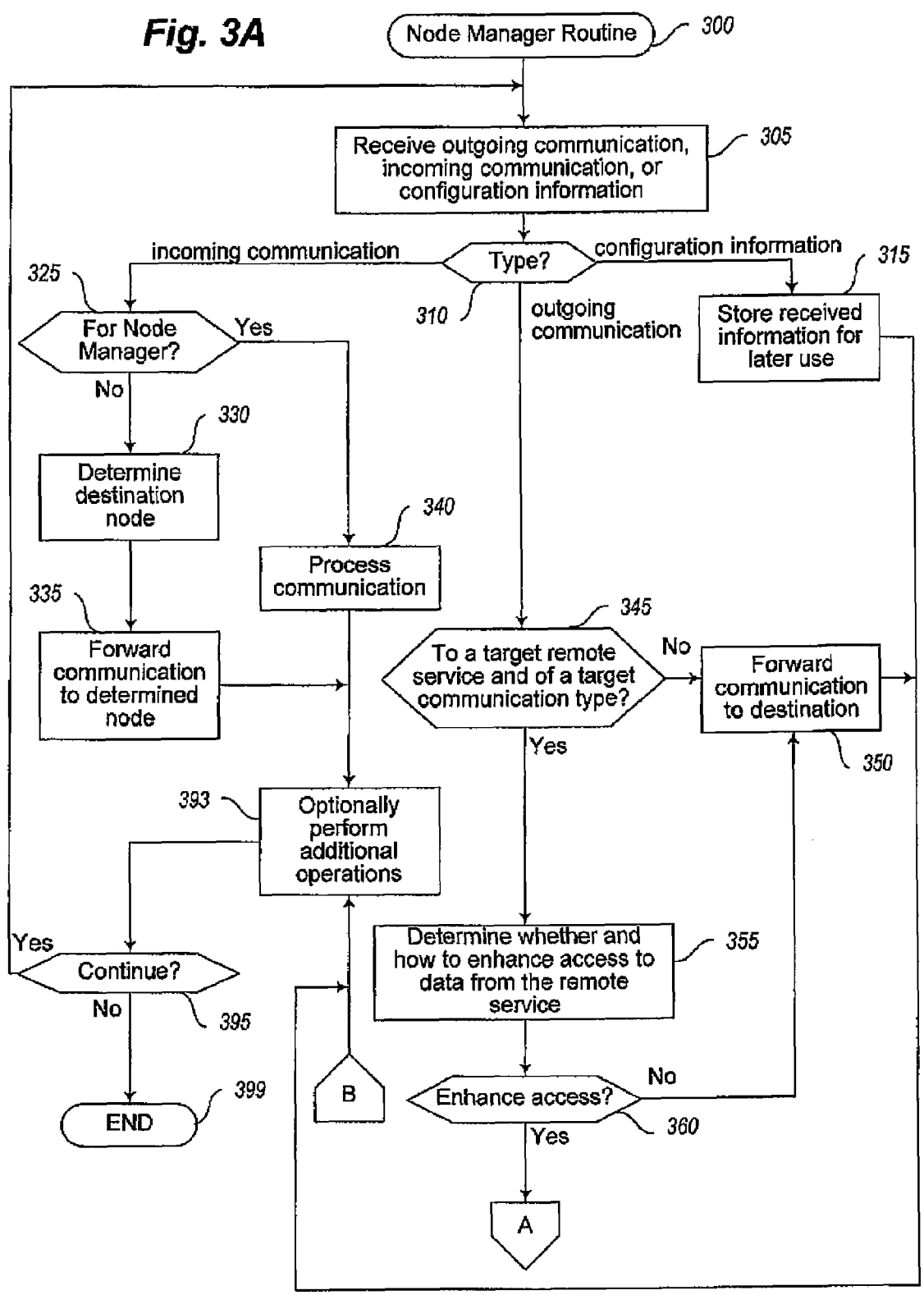

PROVIDING ENHANCED DATA RETRIEVAL FROM REMOTE LOCATIONS

TECHNICAL FIELD

The following disclosure relates generally to providing client computing nodes with enhanced access to remote data.

BACKGROUND

As the use of the Internet and the World Wide Web ("Web") has become widespread, it is increasingly common for software applications to access and use services provided by remote computing systems, such as via defined APIs ("application program interfaces"). Such remote services may provide a variety of types of functionality, and in some situations may be provided by third parties, such as for a fee. One example of such remote services are Web services, which allow heterogeneous applications and computers to interact, and which may be defined and implemented using a variety of underlying protocols and techniques. For example, some Web service implementations return data in XML ("extensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

In addition, software applications may be executed and interact with remote services in various ways. For example, data centers housing significant numbers of interconnected computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided a partial solution to the problem of managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. When a software application executing on a virtual machine hosted by a computing system in a data center sends a communication to a remote service external to the data center, the communication typically passes through management software on the computing system and then multiple other devices before leaving the data center and traveling to the computing system providing the remote service.

Although Web services and other remote services allow various applications and computers to interact, the current implementations and uses of Web services have various problems. For example, due to the insecure nature communications over the Web, if such a remote service provides confidential or otherwise restricted data and other functionality, the remote service will typically use multiple front-end computing devices to handle communications from remote clients in order to shield various back-end devices that store the restricted data or otherwise provide the restricted functionality. Thus, a request sent from a client to a remote service to, for example, obtain stored data will typically pass through multiple other devices of the remote service before reaching a storage device that holds the data, and then the data sent in response will typically take the same or a similar path in traveling through multiple devices of the remote service before between sent back to the client over one or more networks. Unfortunately, such request handling by the remote service consumes significant resources (e.g., may necessitate expensive hardware setups to accommodate the communications, such as by having one or more hardware load balancers that receive communications and then direct each communication to an appropriate one of multiple Web server devices to handle authentication and other pre-processing activities for the communication), and may significantly delay the receipt of requested data or other functionality by the client. Such problems with delay and use of resources may further be exacerbated if the client is a computing system within a data center as previously described, in which communications to and from the computing system typically pass through multiple other devices of the data center before reaching an external network.

BRIEF DESCRIPTION OF THE DRAWINGS

FIGS. 3A and 3B illustrate a flow diagram of an example embodiment of a Node Manager routine.

DETAILED DESCRIPTION

Techniques are described for providing client computing nodes with enhanced access to data from remote locations, such as by providing and using local capabilities specific to the remote locations. In at least some embodiments, the data is provided by remote network-accessible services, such as Web services or other services provided by third parties (e.g., for a fee). The client computing nodes may in at least some embodiments be physical computing systems and/or virtual machines that are each hosted on one or more physical computing systems. In at least some embodiments, the access to remote data by a client computing node may be enhanced by automatically performing activities local to the client computing node that improve the efficiency of communications sent between the client computing node and the remote location. As one example, a node manager system that manages a local client computing node may enhance access to data provided by a remote service by performing activities specific to the remote service that improve data access, such as by using information about the remote service's internal mechanisms (e.g., confidential or otherwise restricted information that is accessible only to authorized requesters) to cause the desired data to be provided from internal storage devices of the remote service without passing through front-end or other intermediate devices of the remote service while traveling to the client computing node. In this manner, the remote service may use fewer resources in providing a given level of capabilities, and the data may be obtained from the remote service more efficiently. In at least some embodiments, the described techniques are automatically performed by an embodiment of a Node Manager system, as described in greater detail below.

Figure 1A:
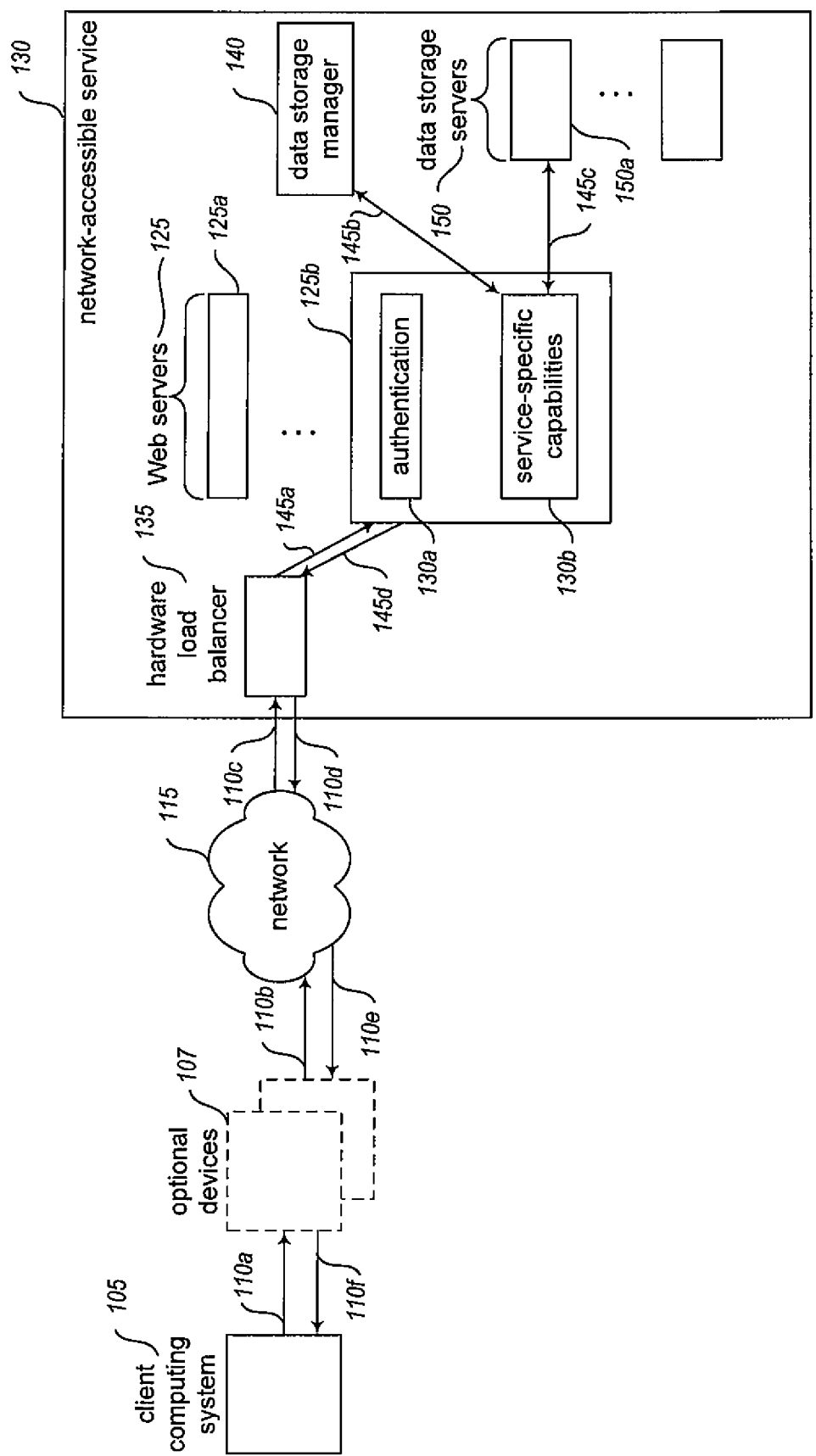
FIGS. 1A and 1B are network diagrams illustrating examples of software applications interacting with remote network-accessible services to obtain requested data.
Figure 1B:
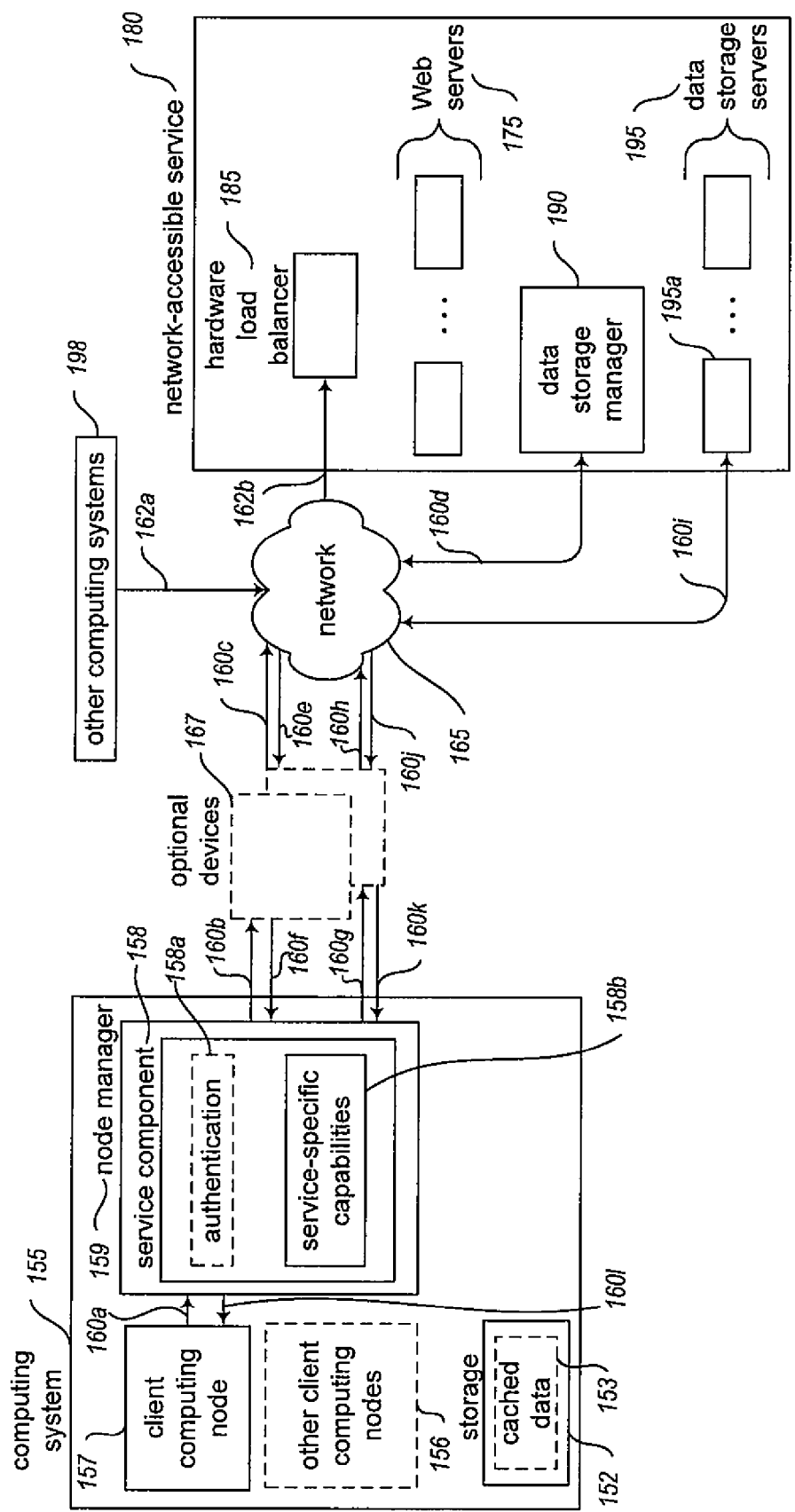

FIG. 1A is a network diagram that illustrates an example of typical types of communications between client nodes and remote network-accessible services as part of the client nodes obtaining requested data from the remote services, and FIG. 1B is a similar diagram with a client node that is a virtual machine and a node manager system that provides enhanced access to data from remote network-accessible services. In particular, in the example of FIG. 1A, a software program (not shown) executing on a client computing system 105 initiates a communication 110a to request desired data from a remote network-accessible service 130. The communication 110a may optionally be received and forwarded 110b by one or more optional devices 107 before reaching a network 115 (e.g., the Internet) in this example. The optional devices 107 may include, for example, one or more proxy server devices and/or networking devices (e.g., routers), such as if client computing system 105 is part of a local area network of an organization or is connected to the network 115 via devices of an ISP ("Internet Service Provider"), and in some situations the devices 107 may perform some filtering or other processing of communications. In other embodiments, no such devices 107 may be present and/or other types of communication forwarding may occur, including communications that are not forwarded over such a network.

After the communication 110a passes through the network 115, it is forwarded 110c to the remote network-accessible service 130. In this example, the service 130 includes a hardware load balancer 135, which receives incoming communications and directs them to an appropriate one of multiple Web server devices 125, with communication 110a being forwarded 145a to Web server 125b in this example. In this example, the remote service 130 is a Web service, and the initiated communication may be an HTTP-based SOAP or REST communication that invokes an API provided by the remote service. In other embodiments, other types of remote services and/or communications may be used. Furthermore, in embodiments with types of remote services other than Web services, types of servers other than Web servers may be used to process communications, and/or hardware load balancers may not be used.

As illustrated in detail for Web server 125b, each of the Web servers in this example may perform various activities as part of service 130's response to the communication and provision of corresponding data as appropriate. In this example, Web server 125b includes a component 130a to perform authentication of the incoming communication, such as to protect access to restricted data, and may have one or more other components 130b to provide other capabilities specific to the service 130. The authentication of the incoming communication may have various forms, such as to verify that the communication is from a particular client (e.g., based on use of a predefined client identifier and/or of secret information specific to that client, such as from a prior registration by the client or other prior interactions with the client), to verify that the communication contents have not been changed after it is created (e.g., based on an included message digest using a cryptographic hash or other form of digital signature, or based on use of a checksum), etc. The other service-specific capabilities from components 130b may also have various forms. In this example, the service 130 provides clients with access to various types of stored data (e.g., data previously stored by the clients). Accordingly, if the communication 110a is a request for a particular group of stored data, the service-specific capabilities may include interacting 145b with a data storage manager 140 to determine on which of multiple data storage servers 150 that the requested data is stored, and then interacting 145c with a particular data storage server (in this example server 150a) to retrieve the requested data.

The Web server 125b that is handling the received communication 110a then responds to the communication as appropriate, which in this example includes sending the requested stored data to the client 105. In particular, the Web server 125b sends one or more response communications to the client 105 that travel the same or a similar path in reverse as did communication 110a when traveling to the remote service from the client. In this example, a response communication 145d is sent to the hardware load balancer 135, which forwards 110d the communication to the network 115. The communication 145d is then forwarded 110e to the optional devices 107 (if present), which forward 110f the communication 145d to the client 105. In this manner, the client 105 may obtain requested data from a remote service. It will be appreciated that the example in FIG. 1A is greatly simplified for the sake of understanding, and that large numbers of clients may be simultaneously accessing large numbers of remote services via numerous network devices and other intermediate devices.

FIG. 1B is a network diagram that is similar to FIG. 1A, but illustrates a client that is a virtual machine node, and the use of a node manager system to provide enhanced access to data from remote network-accessible services. For illustrative purposes, some embodiments are described herein in which specific types of computing nodes, networks, communications, and activities are performed. These examples are provided for illustrative purposes and are simplified for the sake of brevity, and the inventive techniques can be used in a wide variety of other situations, some of which are discussed herein. In particular, in the example of FIG. 1B, the client is a virtual machine node 157 executing on a computing system 155, which may optionally also be executing other virtual machine computing nodes 156. The computing system 155 also executes a node manager software system 159 that manages at least some operations of the virtual machine nodes of the computing system, such as by acting as part of a hypervisor or other virtual machine monitor for the computing system 155. Such virtual machine monitors may receive and forward outgoing communications from virtual machine nodes, and receive and direct incoming communications to a designated virtual machine node recipient.

In this example, a software program (not shown) executing on client node 157 initiates a communication 160a to request desired data from a remote network-accessible service 180. Remote service 180 is a service from which data may be obtained in a manner similar to or identical to that of service 130 of FIG. 1A, and the communication 160a is to obtain the data from the remote service in a manner similar to that of communication 110a of FIG. 1A. The client node 157 is unaware of the presence of node manager 159 in this example, and thus communication 160a may be identical or near-identical to that of communication 110a of FIG. 1A (e.g., if sent by the same client to the same remote service to obtain the same requested data). However, in this example the communication 160a is received by the node manager 159 before leaving the computing system 155. Moreover, unlike the example in FIG. 1A, the node manager 159 in this example provides additional capabilities rather than merely forwarding on the communication 160a. In particular, the node manager 159 includes a software component 158 that is specific to remote service 180, so that the component 158 may be used by the node manager 159 to enhance access to the data from the remote service 180 (e.g., by accessing restricted information from service 180 or otherwise using such restricted information, such as information related to internal operations of service 180; by performing some activities that would otherwise be performed by the remote service 180; etc.). In this example, the software component 158 includes one or more sub-components 158b to provide capabilities specific to the remote service 180 (e.g., to access restricted information and/or restricted internal devices of the remote service), and optionally includes a sub-component 158a to provide authentication-related capabilities for the remote service.

The sub-component(s) 158b in this example embodiment provide some or all of the capabilities of component(s) 130b of FIG. 1A, including capabilities to interact with the internal data storage manager 190 of service 180 to determine which of the internal data storage servers 195 of service 180 store desired data, and/or to interact with those one or more data storage servers 195 to obtain that stored desired data. Thus, the node manager system uses the sub-component 158b to interact with internal systems of the remote service 180 to obtain requested data in an enhanced manner for the client computing node. In particular, after communication 160a is authenticated (if sub-component 158a is present and used), one of the other sub-components 158b initiates a new communication 160b to obtain requested data from the remote service 180. In particular, rather than using the default interface of remote service 180, in which new incoming communications are directed to a hardware load balancer 185 for forwarding to one of the Web servers 175, the communication 160b from the node manager 159 is directed to an internal data storage manager system 190 of the remote service 180 (e.g., using a separate interface that is not publicly exposed and/or that is available only to authorized requesters, or by otherwise using restricted information regarding the location of and/or mechanism for accessing that system). In a manner similar to FIG. 1A, the communication 160b optionally passes through one or more devices 167, and if so is forwarded 160c by them to a network 165. However, the communication 160b is forwarded by the network directly to the data storage manager system, resulting in interactions 160d to obtain information on which of multiple data storage servers 195 that the requested data is stored. The information about the data storage server that stores the requested data (in this example, data storage server 195a) is then forwarded 160e back to the node manager 159, optionally passing through the device(s) 167, and if so is forwarded 160f by them to the node manager. In this manner, one or more internal devices of the service 180 are bypassed for these communications, such as the Web servers 175 and hardware load balancer 185 that would otherwise be intermediate devices along a longer transmission path for the communications if the default interface for interacting with the service 180 was used.

It will be appreciated that new communication 160b generated by node manager 159 in this example may be based on received communication 160a in various ways, such as to create communication 160b by altering communication 160a or to otherwise include information from communication 160a in communication 160b (e.g., information specific to client node 157, such as a client identifier corresponding to a user or other client on whose behalf the executing software initiates the communication 160a; information specific to the request, such as an identifier corresponding to the desired information; etc.). In addition, new communication 160b may include additional information that is not included in received communication 160a, such as information specific to node manager 159 so that the new communication 160b will be treated by the remote service 180 as coming from an authorized requester.

After the node manager 159 receives the information from the remote service indicating that data storage server 195a stores the desired data, the node manager 159 initiates an additional communication 160g that is directed to the particular data storage server 195a that stores the desired data. The communication 160g optionally passes through the device(s) 167, and if so is forwarded 160h to the network 165. The communication 160g is then forwarded to data storage server 195a, resulting in interactions 160i to obtain the stored requested data. The obtained data is then forwarded 160j back to the node manager 159, optionally passing through the device(s) 167, and if so is forwarded 160k by them to the node manager. After receiving the requested stored data, the node manager 159 sends communication 160l to client node 157 to provide the data to the client node. In at least some embodiments, communication 160l will be sent to client node 157 by node manager 159 as if the communication arrived from the remote service 180 in response to the initial communication 160a, without any indication of node manager 159 being involved. Thus, as previously noted, client node 157 may be unaware of some or all of the activities of the node manager 159, including that the node manager alters communication 160a and/or replaces communication 160a with one or more communications from the node manager 159. Furthermore, one or more internal devices of the service 180 are again bypassed for these communications, such as the Web servers 175 and hardware load balancer 185 devices.

While not illustrated here, in some embodiments the access of client node 157 to data from remote services or other remote locations may be further enhanced in additional ways. For example, node manager 159 may track or have access to information about each of the virtual machine nodes 157 and 156 and about communications between the virtual machine nodes and remote services, and may use that information in various ways. As one example, in some embodiments, the node manager system 159 may maintain a local cache of data from at least some services (or may otherwise use such a cache maintained by someone else) to provide various functionality. In the example embodiment of FIG. 1B, the computing system 155 optionally includes various locally cached data on storage 152 under the control of the node manager 159, although in other embodiments some or all of such locally cached data may instead be stored on one or more other devices proximate to computing system 155. When such cached data is available, the node manager 159 may use the cached data to enhance access of the client nodes 156 and 157 in various ways. For example, if one of the client nodes requests data from service 180 or other remote service (not shown), after the node manager intercepts the outgoing communication to request the data, the node manager may in at least some situations first check if the requested data is available in a local cache. If so, the node manager system may in at least some embodiments retrieve a copy of the requested data from the local cache (e.g., if the cached data is sufficiently recent or satisfies one or more other specified criteria) and provide the retrieved data to the client node, such as in response to the intercepted communication. The node manager may optionally use such cached data without forwarding the intercepted communication to the remote service (e.g., in a manner transparent to the client node), or in other embodiments may allow the communication to the remote service to proceed (e.g., to verify that the data later received from the remote service is the same as the cached data, and if not to send an additional communication to the client node with the updated data received from the remote service). In addition, the information that is cached may be selected and maintained in various ways in various embodiments. For example, the node manager 159 may cache at least some types of data provided by at least some remote services to one of the client nodes 156 and 157, so that the cached data is available if later requested by that same client node again or by another client node. Furthermore, in embodiments in which a remote service stores data that is provided to it by client nodes, the node manager system may cache data that is being sent by a client node to the remote service for storage, to allow more rapid retrieval (and less load on the remote service) if that cached copy of data is still available (e.g., has not been replaced by other data using standard cache replacement techniques) when the client node later requests the stored data from the remote service.

Furthermore, in some embodiments the access of client node 157 to data from remote services or other remote locations may be further enhanced by the node manager 159 taking action to pre-fetch some information from a remote service so that later access to desired data from the remote service may be performed more efficiently and/or rapidly using the pre-fetched information. As one example, when retrieving a particular group of data stored at a remote location, in some embodiments a data locator reference for that group of data may be retrieved, which may provide a handle or pointer or other reference indicating where that group of data is stored or that may otherwise include information usable to directly access that group of data. When pre-fetching such information, the node manager 159 may interact with remote service 180 in a manner similar to that of other default client requests (e.g., by sending requests that are handled by the hardware load balancer 135 and a Web server 125), or may instead use a specialized interface or other specialized access mechanism, such as a restricted access mechanism available only to authorized requesters. In addition, information from a remote service may be pre-fetched at various times and for various reasons. In some embodiments, the pre-fetching of information from a remote service for data by the node manager system may be performed periodically for some or all client nodes and some or all data that may be requested by those client nodes. In other embodiments, the pre-fetching of information from a remote service for a particular group of data may be performed by the node manager system when there is a sufficiently likelihood that one or more client nodes may request that particular group of data, such as after a client node has requested a related group of data (e.g., after a client node has requested a first Web page, to pre-fetch one or more other Web pages to which the first Web page includes links; or after a client node has requested a first block of data previously stored by the client node, to pre-fetch one or more successive blocks of data that were previously stored by the client node together with the first block). Furthermore, in some embodiments, information may be pre-fetched from a remote service for a particular group of data when the node manager intercepts a communication from a client node to the remote service for that group of data or when the node manager otherwise receives an indication that the client node will request that group of data in the near future.

In addition, communications from client node 157 to a remote service may be further enhanced in additional ways. For example, various types of information about virtual machine node 157 may be used by the node manager 159 for various purposes, such as when authenticating a communication, or when performing data retrieval. Such client-specific information may include, for example, information about one or more software programs that issued the communication, an identify of a user or other client associated with the virtual machine node, information about previous data storage activities or other activities by the client, etc. Moreover, in at least some embodiments, the node manager system may enhance access to data from remote services for only certain communications from virtual machine nodes. For example, the node manager 159 may further have a second service component (not shown) that is specific to a second remote service, but may not have a service-specific component for a third remote service (not shown). If so, the node manager 159 may use that second service component to enhance access to data from that second remote service for at least some communications from virtual machine nodes, but may merely forward communications between virtual machine nodes and that third remote service without providing any enhanced access to data from that third remote service. In addition, only certain types of communications to remote services may be enhanced, such as to enhance communications for specific types of functionality (e.g., requests to store data and/or to retrieve stored data for remote service 180), but not for other types of functionality (e.g., to access account information or other administrative information for a client).

Thus, in the example of FIG. 1B, due to the service-specific capabilities 158, the node manager 159 is able to obtain the data from remote service 180 that is requested by client node 157, but in an enhanced manner that does not involve any interactions with the hardware load balancer 185 or the multiple Web servers 175 of the remote service. Accordingly, in this example, the return path for the data being returned is shorter than would otherwise be the case, such as to allow the data to be received more rapidly by the client node 157. Furthermore, those parts of the remote service 180 may have additional capacity to handle other requests via the standard default interface (e.g., communication(s) 162a from other computing systems 198 that are forwarded 162b to the hardware load balancer 185 via the network 165), or in some situations may be reduced or eliminated (e.g., to reduce the number of Web server devices). While the return data path in this example was enhanced so as to be shorter, the return data path may be enhanced in other manners in other embodiments. For example, in some embodiments, a node manager system may enhance at least some interactions with remote services so that data or another response being returned is cheaper, faster or otherwise improved over the return data path that would otherwise be used (e.g., based on the use of hardware with different costs or capabilities, based on the use of communication links with different costs or capabilities, etc.), regardless of whether the return data path is shorter or longer in terms of the number of hops or other distance measure.

In the example of FIG. 1B, the enhanced access to the data of the remote service 180 involved additional communications by the node manager 159 relative to the communications from computing system 105 in FIG. 1A, since the node manager 159 first retrieved information about which data storage server held the desired data, and then interacted with that data storage server to obtain the desired data. Such additional communications may be warranted in certain situations, such as if the monetary or other costs (e.g., time costs) of such additional communications are outweighed by the benefits from the enhanced access. In other embodiments, such additional communications by the node manager 159 may not be used, such as if desired data from a particular remote service may be obtained with a single communication to the remote service (e.g., via a standard interface for the remote service, or via a single communication to one or more internal parts of the remote service). For example, with respect to example remote service 180, the node manager system could send a single message to one of the Web servers 175 (whether via the hardware load balancer 185, or instead directly, such as if the service-specific capabilities 158b include software-based load balancing capabilities) to obtain and provide the desired data. Alternatively, if the data storage manager 190 was instead able to retrieve and provide desired data rather than providing information about where that data is located, a single communication from the node manager 159 could instead be sent to the data storage manager 190 (whether via the hardware load balancer 185 and/or a Web server 175, or instead directly) to obtain and provide the desired data. In some embodiments, other communications than those illustrated may occur, such as to perform pre-fetching activities as previously noted, or if the performance of authentication activities by node manager 159 using authentication sub-component 158a involves one or more communications to the remote service 180, such as to coordinate the authentication activities with one of the Web servers 175 or for other purposes.

It will be appreciated that the example of FIG. 1B is simplified for the sake of explanation, and that the described techniques may be used in a variety of other situations. For example, while the node manager 159 provides the data access enhancement capabilities in FIG. 1B, in other embodiments other systems or devices may provide similar functionality. For example, one or more of the devices 107 in FIG. 1A may provide similar functionality for client computing system 105, regardless of whether any virtual machine nodes are present on the computing system 105. Furthermore, in other embodiments, the node manager system and/or client computing node may have other forms. For example, the node manager system may provide an environment in which other software programs may execute (e.g., an emulation environment; an interpreter environment, such as a Java Virtual Machine environment; etc.), and the client computing node may be a software program executing within the node manager system environment.

In addition, various additional types of functionality may be provided as part of enhancing access to data from remote services in at least some embodiments. For example, as previously noted, in at least some embodiments and situations a node manager system may be able to perform all activities needed to respond to a request from a managed computing node for data from a remote service without interacting with the remote service, and if so may directly generate and provide a response to the managed computing node. As one example, in some embodiments, one or more node manager systems may maintain a local cache or other store of information received from one or more remote services, and may respond to requests for particular groups of stored data from a remote service with locally stored copies of the data (e.g., if the locally stored data is sufficiently recent and/or satisfies other criteria).

A node manager system may intercept or otherwise receive copies of communications sent from managed computing nodes in various ways in various embodiments. As previously noted, in some embodiments a physical architecture of inter-connections will cause such communications to be directed through the node manager system, such as if the node manager system is part of a hypervisor for a client virtual machine node, or if the node manager system is part of a proxy system managing communications from a client computing system. In addition, the node manager system may perform activities such as causing a domain name specified by a client node to be resolved to a network address (e.g., an IP address) in a specialized manner, such as to select a network address corresponding to the node manager system and thus cause the client node to communicate with the node manager system while the client node believes that the node manager system is actually an intended remote service. Furthermore, when generating one or more communications to a remote service on behalf of a managed computing node, the node manager system may further in some embodiments consider various options about how the remote service may provide requested data and attempt to select an optimal or otherwise preferred option—as one example, if the remote service has multiple alternative computing systems that may provide a particular type of requested functionality, the node manager system may attempt to select the remote service computing system that is most proximate (e.g., in a geographical sense and/or logical network sense) and/or that currently has the most capacity (e.g., by performing software-based load balancing).

As previously noted, in at least some embodiments the node manager system may perform its activities to enhance access for a managed computing node to data from a remote service without awareness and/or acquiescence of the managed computing node, while in other embodiments such awareness and/or acquiescence of the managed computing node may be present. Similarly, while in at least some embodiments the node manager system may interact with a remote service on behalf of a managed computing node in such a manner that the remote service is aware of and/or acquiesces to the activities of the node manager system (e.g., with the node manager system acting as an authorized requester that has increased privileges relative to others such as the managed computing node), in other embodiments the remote service may not be aware of and/or acquiesce to the node manager system interactions being performed by other than the managed computing node. Regardless of the awareness or acquiescence of the managed computing node and/or remote service, the node manager system may in at least some embodiments further perform its activities and interactions with the managed computing node and/or remote service in such a manner as to satisfy any established parameters for interactions between the managed computing node and remote service (e.g., to satisfy any communication volume constraints, communication timing constraints, communication quality constraints, etc.).

Furthermore, in some embodiments, the node manager system may enhance access only to data from certain remote services, such as remote services provided by the same entity as the entity who operates the node manager system, remote services that have a predefined affiliation with the node manager system, remote services that provide service-specific components and/or interfaces to enable the node manager to provide the enhanced access to the data of the remote service, etc.

Thus, the described techniques for a node manager system to enhance access by a managed computing node to data from a remote service may provide a variety of benefits, including benefits to the managed computing nodes, to the remote service, and/or to the node manager system. For example, by enabling a node manager system to perform at least some activities specific to a remote service, the remote service may in some embodiments and situations obtain benefits equivalent to having a distributed or decentralized service, but without having to provide and maintain the computing systems and related software on which the node manager systems operate. In addition, with respect to managed computing nodes and node manager systems, the operation of the node manager systems may in some embodiments and situations enable faster communications and/or less communications. For example, if a node manager system maintains a local data cache and uses copies of data from the cache to respond to requests for data from client nodes, the amount of network traffic to a remote service and the load on the hardware resources of the remote service may be significantly diminished, and the speed of response to the client node may be significantly enhanced. Pre-fetching at least some information from a remote service may similarly diminish the load on the hardware resources of the remote service, as well as enhance the speed of response to the client node when the data is requested.

In addition, while not illustrated in FIGS. 1A and 1B, in at least some embodiments computing systems 105 and/or 155 may be part of a group of related physical computing systems, such as multiple computing systems that are part of a program execution service for executing multiple programs on behalf of multiple users of the service. Such a program execution service may use multiple computing systems on multiple physical networks (e.g., multiple physical computing systems and networks within a data center) in order to execute third-party customers' programs, including multiple virtual machine nodes on at least some of the computing systems that are each able to execute one or more programs for a customer. In such embodiments, customers may provide programs to be executed to the execution service, and may reserve execution time and other resources on physical or virtual hardware facilities provided by the execution service. In addition, customers may define virtual networks that will be used by the program execution service, so as to transparently provide computing nodes of the virtual network with the appearance of operating on a dedicated physical network. Additional details related to the operation of example embodiments of a program execution service with which the described techniques may be used are available in U.S. application Ser. No. 11/394,595, filed Mar. 31, 2006 and entitled "Managing Communications Between Computing Nodes;" in U.S. application Ser. No. 11/395,463, filed Mar. 31, 2006 and entitled "Managing Execution of Programs by Multiple Computing Systems;" and in U.S. application Ser. No. 11/692,038 filed Mar. 27, 2007 and entitled "Configuring Intercommunications Between Computing Nodes;" each of which is incorporated herein by reference in its entirety.

Figure 2:
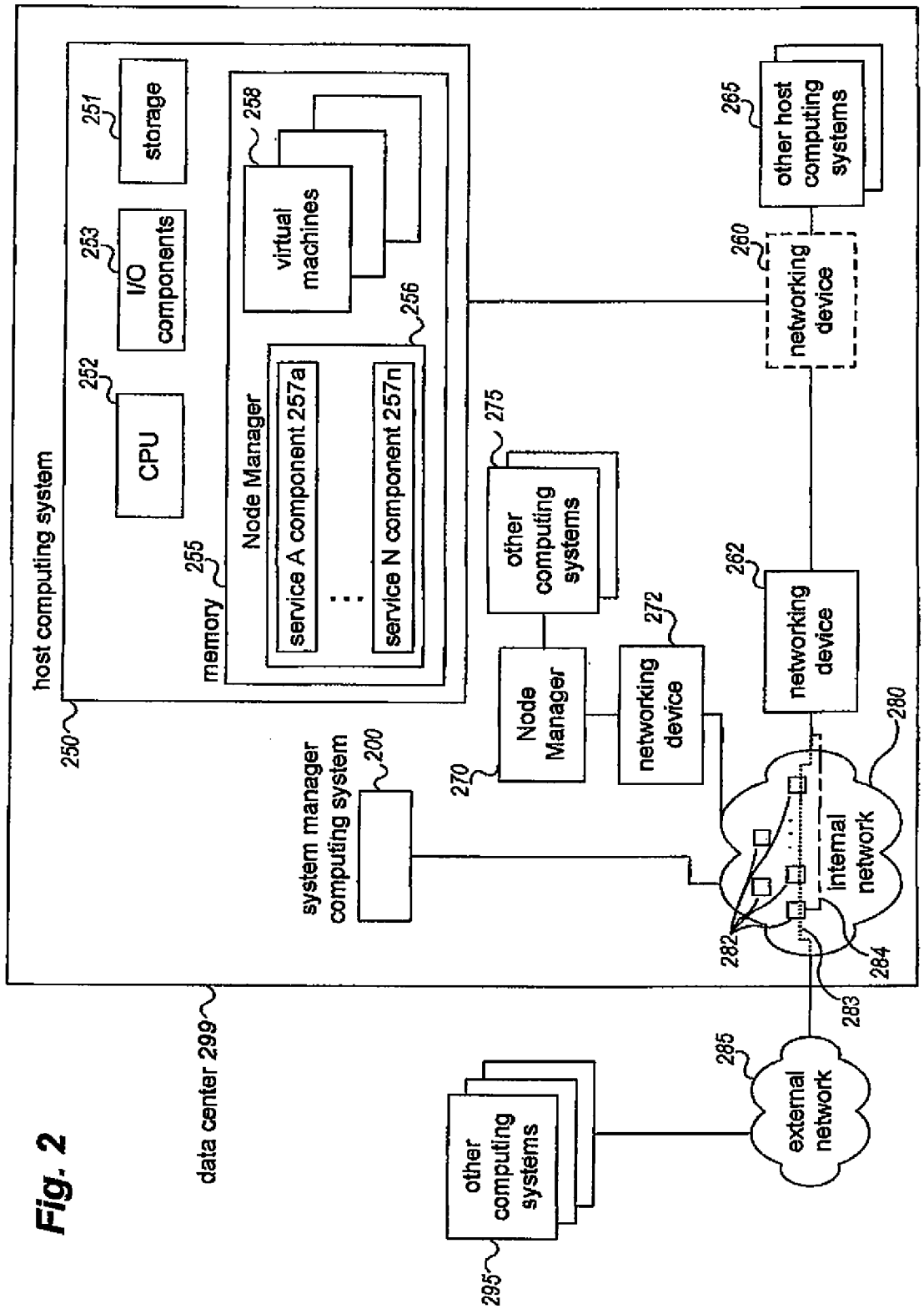
FIG. 2 is a block diagram illustrating an example computing system suitable for executing an embodiment of a system for providing enhanced access to remote data.

FIG. 2 is a block diagram illustrating example computing systems suitable for executing an embodiment of a system for providing enhanced access to data from remote network-accessible services. In particular, FIG. 2 illustrates a data center 299 that includes multiple computing systems (e.g., for use as part of a program execution service), along with multiple Node Manager systems for use in providing enhanced access to data from remote services for at least some of the computing systems of the data center. In this example embodiment, the data center 299 includes a system manager computing system 200 to manage various operations of the data center (e.g., to manage program execution services provided via the data center), an example host computing system 250 capable of executing one or more virtual machine nodes, other host computing systems 265 that are similar to host computing system 250 and may each provide one or more virtual machine nodes, and other computing systems 275 that execute software programs without providing virtual machine nodes.

The computing systems 200, 250, 265 and 275 are connected to one another via an internal network 280, which in this example embodiment includes various internal networking devices 282 (e.g., routers). In addition, various networking devices 262, 272, and optionally 260 may be used to connect the computing systems to the internal network. For example, networking devices 262 and 272 may each be a router or a bridge, and optional networking device 260 may be a switch or a hub. In the illustrated example, the networking device 262 provides a gateway between the network 280 and host computing systems 250 and 265, and the optional networking device 260 may operate to join host computing systems 250 and 265 onto a single physical network. A variety of other networking devices may similarly be present, but are not shown for the sake of simplicity. Thus, the network 280 may be an interconnection network that joins multiple disparate physical networks within the data center 299, and provides access in this example to external computing systems 295 via an external network 285. In a typical arrangement, data center 299 may include hundreds or thousands of host computing systems such as those illustrated here, organized into a large number of distinct physical networks. The external computing systems may also provide various functionality, including providing various remote services (not shown) that are available to the computing systems of the data center.

Host computing system 250 is shown in additional detail relative to the other computing systems for the purpose of illustration, and includes a CPU 252, various I/O components 253, storage 251, and memory 255. Particular I/O components are not shown, but may include, for example, a display, network connection, computer-readable media drive, and other I/O devices (e.g., a mouse, keyboard, etc.). The host computing system 250 functions to host one or more virtual machines 258 in memory 255, such as to execute programs on behalf of various customers. A Node Manager system 256 is also executing in the memory 255 to manage operations of the virtual machines 258. In addition, in the illustrated embodiment, the Node Manager system 256 operates to provide the virtual machines 258 with enhanced access to data from remote network-accessible services in a manner similar to that discussed in greater detail elsewhere. In this example, the Node Manager system 256 includes various service-specific components 257a-257n for use in interacting with remote services A-N (not shown), such as remote services provided by the other computing systems 295.

As previously discussed, in at least some embodiments, the Node Manager systems may enhance access to data from remote services by directly interacting with internal devices of the remote services in at least some situations, and thus bypassing other internal devices of the remote services that would otherwise by default be involved in those interactions. Furthermore, in at least some embodiments, the Node Manager systems may enhance access to data from remote services by causing outgoing communications from the data center and/or incoming communications to the data center to bypass at least some devices internal to the data center. For example, a typical communication between host computing system 250 and one of the other computing systems 295 may follow path 283 through the internal network 280, passing through (or otherwise involving) several internal networking devices 282. The multiple networking devices 282 may be used for various purposes, such as load balancing, to provide resolution of an internally used network address for host computing system 250 to a different network address that is externally exposed for the host computing system 250, etc. In some embodiments, the Node Manager systems may further have access to information specific to the data center (or other group of related computing systems) that the Node Manager systems may use to enhance at least some communications between internal managed computing nodes and external remote services. In particular, in this example, Node Manager system 256 may cause one or more communications between host computing system 250 and one of the other computing systems 295 to follow an alternative shorter path 284 through the internal network 280, such as to pass through (or otherwise involve) only a single internal networking device 282. The shorter path may be enabled in various ways, such as by the Node Manager system providing the remote service with a network address for the Node Manager system (or managed host computing node) that will cause an incoming communication to bypass one or more of the intermediate internal devices of the data center.

The other host computing systems 265 may each be similar to that of host computing system 250, such as by each including one or more virtual machines (not shown) and a Data Manager system (not shown) to manage operations of those virtual machines. In addition, this example embodiment includes multiple computing systems 275 that do not host virtual machines, and a separate computing device that acts as Node Manager system 270 to similarly provide those computing systems 275 with enhanced access to remote network-accessible services.

It will be appreciated that computing systems 200, 250, 265, 275, and 295, and networking devices 260, 262, 272 and 282, are merely illustrative and are not intended to limit the scope of embodiments of the present disclosure. For example, computing system 250 may be connected to other devices that are not illustrated, including through one or more other networks external to the data center 299, such as the Internet or via the Web. More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate intercommunication capabilities. In addition, the functionality provided by the illustrated components and systems may in some embodiments be combined in fewer components or distributed in additional components. Similarly, in some embodiments the functionality of some of the illustrated components may not be provided and/or other additional functionality may be available.

It will also be appreciated that, while various items are illustrated as being stored in memory or on storage while being used, these items or portions of them can be transferred between memory and other storage devices for purposes of memory management and data integrity. Alternatively, in other embodiments some or all of the software components and/or systems may execute in memory on another device and communicate with the illustrated computing system via inter-computer communication. Some or all of the components, systems and data structures may also be stored (e.g., as software instructions or structured data) on a computer-readable medium, such as a hard disk, a memory, a network, or a portable media article to be read by an appropriate drive or via an appropriate connection. The systems, components and data structures may also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 3B:
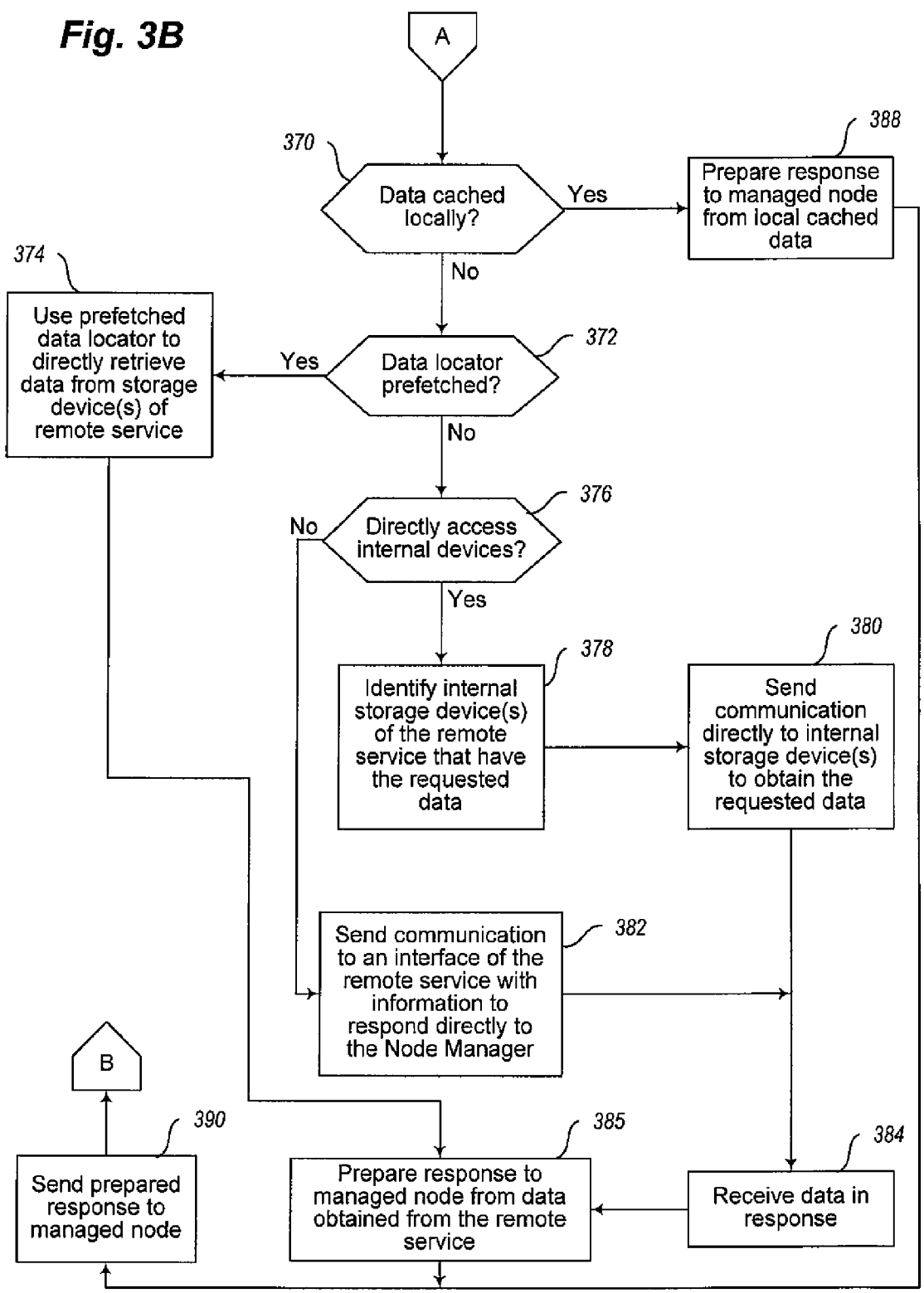

FIGS. 3A and 3B illustrate a flow diagram of an example embodiment of a Node Manager routine. The routine may be provided by, for example, execution of the Node Manager systems 256 or 270 of FIG. 2 and/or of the Node Manager system 159 of FIG. 1B, such as to provide client computing nodes with enhanced access to remote data.

The illustrated embodiment of the routine 300 begins at block 305, where it receives an outgoing communication, an incoming communication, or configuration information. In this embodiment, an outgoing communication is a communication sent by a computing node managed by the routine, such as a virtual machine executing on a managed host computing system. An incoming communication is a communication sent by an external computing system to a managed computing node or the node manager system. Configuration information includes information that may be used by the routine to provide managed local client nodes with enhanced access to data from remote services, such as information for a remote service to use in providing enhanced access for that remote service (e.g., a software component that when executed provides at least some capabilities specific to the remote service), or configuration information regarding what types of communications to which remote services from which managed nodes are to be handled by the routine. The communications and/or configuration information may be received in various ways, such as if the node manager routine is part of a component through which communications to and/or from the managed computing nodes pass, or if the node manager routine may otherwise receive and optionally modify or otherwise manipulate such communications.

In block 310, the routine determines the type of communication or information received, and continues to block 315 if configuration information is received. In block 315, the routine stores the received configuration information for later use.

If it is instead determined in block 310 that an incoming message or other communication has been received, either for the Node Manager or for one or more managed computing nodes, the routine continues to block 325 to determine if the communication is for the Node Manager routine. Such incoming communications for managed computing nodes or the Node Manager routine may include a variety of types of communications, including communications that are unrelated to accessing data from remote services. If it is determined in block 325 that the communication is for the Node Manager routine, the routine continues to block 340 to process the received communication (e.g., to store the communication for later use by an operator user who maintains the Node Manager), and if not the routine continues to block 330 to determine the one or more destination managed computing nodes for the communication (e.g., based on addressing information for the communication, such as in a packet header that includes a source and destination address). As described in greater detail with respect to block 380, communications that are received by the routine as part of interacting with remote services when providing enhanced access to data from those remote services are handled elsewhere, such as with respect to blocks 374 and 384. In addition, while the illustrated embodiment of the routine does not show activities involved in pre-fetching information from remote services, in some embodiments those activities may be performed and the resulting information may be received in block 340 and stored for later use. After block 330, the routine continues to block 335 to forward the received communication to the determined managed computing node(s). Forwarding the communication may include sending or otherwise transmitting it onto a physical network (e.g., by providing the communication to a network driver or interface to be transmitted via a network interface device) if a destination managed computing node is part of a computing system distinct from the computing system executing the routine, or may include storing the communication in an appropriate location in memory if a destination managed computing node is a virtual machine node on the same computing system as the computing system executing the routine.

If it is instead determined in block 310 that an outgoing communication has been received from a managed computing node, the routine continues to block 345 to determine whether the outgoing communication is to a target remote service for which the routine may provide enhanced data access and whether the outgoing communication is of a type for which the routine may provide enhanced data access, such as to request one or more specified types of data from the remote service. If not, the routine continues to block 350 to forward the received communication to the indicated destination(s). Otherwise, the routine continues to block 355 to determine whether and how to enhance access of the managed computing node to the data of the remote service for the outgoing communication, such as based on previously received configuration information specific to the remote service and/or to the managed computing node. In block 360, the routine then determines whether enhanced data access is to be provided, and if not continues to block 350.

Otherwise, if enhanced data access is to be provided for a communication that requests particular data, the routine continues to provide that enhanced data access with respect to blocks 370-390. In particular, in block 370 the routine determines whether the requested data is locally cached, and if so continues to block 388 to retrieve that locally cached data copy and to prepare a response to the managed computing node that includes the retrieved data. In other embodiments, data may not be locally cached and/or there may be alternative remote locations from which the routine may elect to retrieve a copy of the requested data rather than from the remote service. If it is instead determined in block 370 that locally cached data is not available, the routine continues to block 372 to determine whether one or more data locator references for the requested data have been pre-fetched, and if so continues to block 374 to use the pre-fetched data locator (s) to directly retrieve the requested data from one or more internal storage devices of the remote service. In other embodiments, such pre-fetching may not be performed, or may be performed in ways other than to use data locator references. Furthermore, while the illustrated example of the routine does not show the performance of the pre-fetching activities, such activities may be done at various times as previously described, including in some embodiments after a corresponding outgoing communication is received in block 305.

In the illustrated embodiment, if a corresponding data locator reference was not pre-fetched, the routine continues instead to block 376 to determine whether to directly access internal storage or other devices of the remote service to obtain the requested data in such a manner as to bypass one or more other devices of the remote service that would otherwise be involved in such data retrieval. Such direct access may be performed in various ways, such as based on restricted information about internal mechanisms of the remote service and/or on use of a restricted interface to the remote service that is not publicly available, and in some embodiments such direct access may not be used. If so, the routine continues to block 378 to identify one or more internal storage devices of the remote service that have the requested data, and in block 380 sends one or more communications directly to the identified internal storage device(s) for them to respond with the requested data. In some embodiments, information may further be provided in the sent communications to enable the internal storage device(s) to respond in a manner that causes one or more response communications to bypass one or more other internal devices of the remote service and/or one or more computing devices that are part of a group associated with the computing system executing the routine (e.g., one or more computing devices internal to a data center in which the computing system executing the routine is located). Otherwise, if it is determined in block 376 that direct access is not to be performed, the routine continues to block 382 to send a communication to an interface of the remote service to respond with the requested data, with the communication sent in such a manner as to cause the remote service to bypass one or more other internal devices of the remote service and/or one or more computing devices associated with the computing system executing the routine when providing one or more response communications (e.g., by sending the communication to a default interface of the remote service and providing information specific to how the response communications are to be performed, by sending the communication to a restricted private interface of the remote service and/or by invoking restricted functionality, etc.).

After blocks 380 or 382, the routine continues to block 384 to receive one or more response communications from the remote service that include the requested data. After receiving the requested data in block 384 or directly retrieving the requested data in block 374, the routine continues to block 385 to prepare a response message for the managed computing node to the received outgoing communication, such as to forward one or more of the responses received in block 384.

After blocks 385 or 388, the routine continues to block 390 to send the prepared response to the managed computing node. After blocks 315, 335, 340, 350 or 390, the routine continues to block 393 to optionally perform one or more additional operations, such as to initiate pre-fetching of data locator references for one or more groups of data from one or more remote services, or to reflect housekeeping activities or other activities that are not related to providing enhanced access to remote services. The routine then continues to block 395 to determine whether to continue processing received communications and configuration information. If so, the routine returns to block 305, and if not continues to block 399 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system that hosts multiple virtual machine nodes to enhance access of the hosted virtual machine nodes to remote data, the method comprising:
    under control of a node manager software system that is executing on the computing system to manage operations of the multiple virtual machine nodes,
        intercepting communications sent from the virtual machine nodes to remote network-accessible Web services provided by remote computing systems, one or more of the intercepted communication being sent to a first remote Web service to obtain functionality provided by the first remote Web service, and one or more other of the intercepted communications being sent to a distinct second remote Web service in order to retrieve requested data stored by the second remote Web service, the second remote Web service providing data to clients by transmitting data stored on storage devices of the second remote Web service via one or more intermediate devices of the second remote Web service, the first and second remote Web services being separated from the computing system by one or more intervening computer networks, and the node manager software system not being part of either of the first and second remote Web services;
    for each of the one or more intercepted communications sent to the first remote Web service, forwarding the intercepted communication to the first remote Web service over the one or more intervening computer networks without altering the forwarded communication; and
    for each of the one or more other intercepted communications sent to the second remote Web service, automatically altering the intercepted communication by:
        identifying one or more of the storage devices of the second remote Web service that store the data requested by the virtual machine node that sent the intercepted communication;
        altering the intercepted communication to obtain the requested data directly from the identified storage devices of the second remote Web service such that the requested data will not be transmitted via the one or more intermediate devices of the second remote Web service; and
        sending the altered communication to the second remote Web service over the one or more intervening computer networks on behalf of the virtual machine node that sent the intercepted communication.

2. The method of claim 1 wherein the second remote Web service stores data provided by clients to the second remote Web service, and wherein the one or more other intercepted communications are each from a hosted virtual machine node client to retrieve data previously provided by that hosted virtual machine node client to the second remote Web service for storage.

3. The method of claim 2 further comprising locally caching at least some data provided by one of the hosted virtual machine nodes to the second remote Web service for storage, and for an additional one of the intercepted communications that is sent by the one hosted virtual machine node to the second remote Web service to retrieve stored requested data, automatically responding to the additional one intercepted communication by retrieving corresponding locally cached data and providing the retrieved cached data to the one hosted virtual machine node without sending any communications to the second remote Web service.

4. The method of claim 1 further comprising, before intercepting one of the other intercepted communications to the second remote Web service from one of the virtual machine nodes, interacting with the second remote Web service to obtain locator references for particular groups of data stored by the one virtual machine node, the obtained locator references each indicating one or more of the storage devices of the second remote Web service that store data, and wherein the identifying of the one or more storage devices of the second remote Web service that store the requested data for the intercepted one communication is based on use of one or more of the obtained locators references.

5. The method of claim 1 wherein the computing system is part of a group of multiple related local computing systems, wherein communications to the hosted virtual machine nodes of the computing system are by default directed through one or more other of the local computing systems before reaching the computing system, and wherein, for one of the other intercepted communications to the second remote Web service from one of the virtual machine nodes, the altering of the one intercepted communication includes providing information in the altered communication to cause the requested data to be transmitted by the second remote Web service to the computing system without being directed through any of the other local computing systems.

6. The method of claim 1 wherein, for one of the other intercepted communications to the second remote Web service from one of the virtual machine nodes, the altering of the one intercepted communication includes directing the altered communication to the identified one or more storage devices of the second remote Web service that store the data requested by the virtual machine node that sent the one intercepted communication, and the sending of the altered communication to the second remote Web service on behalf of the virtual machine node that sent the one intercepted communication includes directly interacting with those identified one or more storage devices of the second remote Web service.

7. The method of claim 1 wherein the identifying of storage devices of the second remote Web service and the altering of the other intercepted communications to the second remote Web service are based at least in part on interactions between the node manager software system and a software component specific to the second remote Web service.

8. The method of claim 1 further comprising, under control of the second remote Web service:
receiving one or more altered communications sent by the node manager software system, and in response transmitting requested data to one or more of the hosted virtual machine nodes without the transmitted data passing through any of the intermediate devices of the second remote Web service; and
receiving one or more communications sent by one or more other clients, and transmitting requested data to the other clients such that the transmitted data passes through one or more of the intermediate devices of the second remote Web service.

9. A computing system configured to provide improved access to data from remote services, the computing system comprising:
one or more processors;
a memory storing instructions that, when executed by the one or more processors, configure resources of the configured computing system to execute multiple virtual machine nodes; and
a node manager system configured to, when executed on the configured computing system by at least one of the one or more processors, manage operations of the multiple virtual machine nodes, the managing of the operations including:
obtaining one or more first communications that are each initiated by one of the virtual machine nodes and intended for a first remote network-accessible service in order to obtain requested data from the first remote network-accessible service via one or more intermediate devices of the first remote network-accessible service, the first remote network-accessible service being unaffiliated with the node manager system and being provided by one or more first remote computing systems that are separated from the configured computing system by one or more intervening networks;
obtaining one or more second communications initiated by the virtual machine nodes and intended for a second remote network-accessible service in order to obtain indicated functionality from the second remote network-accessible service, the second remote network-accessible service being provided by one or more second remote computing systems that are separated from the configured computing system by the one or more intervening networks;
sending each of the obtained one or more second communications to the second remote network-accessible service over the one or more intervening networks without altering contents of the obtained second communication; and
for each of the obtained one or more first communications:
altering the obtained first communication to cause the first remote network-accessible service to provide the requested data without sending the requested data via at least one of the one or more intermediate devices of the first remote network-accessible service; and
sending the altered communication to the first remote network-accessible service over the one or more intervening networks on behalf of the virtual machine node that initiated the obtained first communication.

10. The computing system of claim 9 wherein the obtained one or more first communications include multiple communications from multiple virtual machine nodes to the first remote network-accessible service, and wherein the configured computing system further comprises a software component for the first remote network-accessible service for use by the node manager system in the altering of the obtained first communications.

11. The computing system of claim 9 wherein the altering of one of the obtained first communications includes identifying an internal device of the first remote network-accessible service from which requested data will be provided, and altering the one obtained first communication to cause the altered communication to be directed to the identified internal device.

12. The computing system of claim 9 wherein the node manager system includes software instructions for execution by the one or more processors of the configured computing system.

13. The computing system of claim 9 wherein the node manager system consists of means for performing the managing of the operations of the multiple virtual machine nodes.

14. A non-transitory computer-readable storage medium having stored contents that, when executed, configure a computing system to provide improved access to data from remote services, by:
configuring resources of the configured computing system to execute multiple virtual machine nodes; and
managing, by a node manager system executing on the configured computing system, operations of the multiple virtual machine nodes, the managing of the operations including:
obtaining one or more first communications that are each initiated by one of the virtual machine nodes and intended for a first remote network-accessible service in order to obtain requested data from the first remote network-accessible service via one or more intermediate devices of the first remote network-accessible service, the first remote network-accessible service being unaffiliated with the node manager system and being provided by one or more first remote computing systems that are separated from the configured computing system by one or more intervening networks;
obtaining one or more second communications initiated by the virtual machine nodes and intended for a second remote network-accessible service in order to obtain indicated functionality from the second remote network-accessible service, the second remote network-accessible service being provided by one or more second remote computing systems that are separated from the configured computing system by the one or more intervening networks;
sending each of the obtained one or more second communications to the second remote network-accessible service over the one or more intervening networks without altering contents of the obtained second communication; and
for each of the obtained one or more first communications:
altering the obtained first communication to cause the first remote network-accessible service to provide the requested data without sending the requested data via at least one of the one or more intermediate devices of the first remote network-accessible service; and
sending the altered first communication to the first remote network-accessible service over the one or more intervening networks on behalf of the virtual machine node that initiated the obtained first communication.

15. The non-transitory computer-readable storage medium of claim 14 wherein the obtained one or more first communications include multiple communications from multiple virtual machine nodes to the first remote network-accessible service, and wherein the managing of the operations of the multiple virtual machine nodes includes using a software component for the first remote network-accessible service as part of altering the obtained first communications.

16. The non-transitory computer-readable storage medium of claim 14 wherein the altering of one of the obtained first communications includes identifying an internal device of the first remote network-accessible service from which requested data will be provided, and altering the one obtained first communication to cause the one altered first communication to be directed to the identified internal device.

17. The non-transitory computer-readable storage medium of claim 14 wherein the obtaining of the one or more first communications includes intercepting, by the node manager system, each of the one or more first communications after the first communication is sent by one of the virtual machine nodes.

18. The non-transitory computer-readable storage medium of claim 14 wherein the stored contents further configure the computing system to, for one of the obtained one or more first communications, receive the requested data for the one obtained first communication from the first remote network-accessible service, and forward the received data to the one virtual machine node that initiated the one obtained first communication.

19. The non-transitory computer-readable storage medium of claim 14 wherein one of the obtained one or more first communications is directed to a first interface of the first remote network-accessible service, wherein the altering of the one obtained first communication includes changing a destination of the one altered first communication from the first interface to a distinct second interface of the first remote network-accessible service, and wherein the sending of the one altered first communication to the first remote network-accessible service includes sending the one altered first communication to the second interface.

20. The non-transitory computer-readable storage medium of claim 19 wherein the first interface of the first remote network-accessible service is a default interface, and wherein the distinct second interface of the first remote network-accessible service is available only to authorized requesters.

21. The non-transitory computer-readable storage medium of claim 14 wherein the stored contents further configure the computing system to identify one or more devices of the first remote network-accessible service from which the requested data for one of the altered first communications will be provided, and wherein the sending of each of the altered first communications to the first remote network-accessible service includes sending the altered first communication directly to the identified one or more devices of the first remote network-accessible service.

22. The non-transitory computer-readable storage medium of claim 21 wherein the identified one or more devices are internal devices of the first remote network-accessible service that are not publicly accessible, and wherein the identifying of the one or more devices includes interacting with the first remote network-accessible service to obtain information about the internal devices.

23. The non-transitory computer-readable storage medium of claim 22 wherein the interacting with the first remote network-accessible service to obtain the information about the internal devices includes providing, by the node manager system, information to the first remote network-accessible service to become recognized as an authorized requester for the first remote network-accessible service.

24. The non-transitory computer-readable storage medium of claim 21 wherein the stored contents further configure the computing system to, before the obtaining of the one or more first communications, pre-fetch information from the first remote network-accessible service about data stored by the first remote network-accessible service for one or more of the multiple virtual machine nodes, and wherein the identifying of the one or more devices of the first remote network-accessible service includes using the pre-fetched information.

25. The non-transitory computer-readable storage medium of claim 21 wherein the identified one or more devices are storage devices, and wherein the identifying of the one or more devices includes obtaining a data locator for a copy of requested data that is stored on the storage devices, to enable the node manager system to subsequently use the obtained data locator as a reference to access that requested data from the storage devices.

26. The non-transitory computer-readable storage medium of claim 14 wherein each of the multiple virtual machine nodes has a distinct assigned network address, and wherein the sending of each altered first communication to the first remote network-accessible service includes sending information regarding the assigned network address of a virtual machine node associated with the sent altered first communication, to enable the first remote network-accessible service to transmit requested data in response to that associated virtual machine node.

27. The non-transitory computer-readable storage medium of claim 14 wherein at least one of altering each obtained first communication or of sending each altered first communication is based at least in part on using, by the node manager system, a software component specific to the first remote network-accessible service.

28. The non-transitory computer-readable storage medium of claim 14 wherein the stored contents further configure the one or more first remote computing systems to, under control of the first remote network-accessible service:
   in response to each altered first communication sent to the first remote network-accessible service, transmit requested data in response to the configured computing system without transmitting the requested data via the at least one intermediate devices of the first remote network-accessible service; and
   receive one or more additional communications sent by one or more clients, and transmit requested data for the one or more additional communications to the one or more clients via the intermediate devices of the first remote network-accessible service.

29. The non-transitory computer-readable storage medium of claim 14 wherein the stored contents further configure the computing system to intercept another communication sent from one of the multiple virtual machine nodes to obtain additional requested data from the first remote network-accessible service, and without interacting with the first remote network-accessible service, retrieve a copy of the additional requested data from storage proximate to the configured computing system and provide the retrieved copy of the additional requested data to the one virtual machine node.

30. The non-transitory computer-readable storage medium of claim 14 wherein the stored contents further configure the computing system to:

intercept one or more additional communications from one of the multiple virtual machine nodes to the first remote network-accessible service to store one or more groups of data provided by the one virtual machine node; and store a copy of at least one of the groups of data in storage proximate to the configured computing system, to enable, at a later time after the storing of the copy, providing of the stored copy to the one virtual machine node.

31. The non-transitory computer-readable storage medium of claim 14 wherein the altering of one of the obtained first communications further includes:

obtaining information about a client associated with one of the multiple virtual machine nodes associated with the one obtained first communication; and authenticating the one obtained first communication based at least in part on the obtained information about the associated client, and wherein at least one of the altering of the one obtained first communication or the sending of the one altered first communication to the first remote network-accessible service is performed based on the authenticating of the one obtained first communication.

32. The non-transitory computer-readable storage medium of claim 14 wherein the first remote network-accessible service includes one or more storage devices from which requested data will be provided for the obtained first communications, and wherein the one or more intermediate devices of the first remote network-accessible service are devices that execute application logic for the first remote network-accessible service.

33. The non-transitory computer-readable storage medium of claim 14 wherein the configured computing system is associated with one or more other local devices through which transmissions to the configured computing system are forwarded, and wherein the sending of each altered first communication to the first remote network-accessible service includes providing information to the first remote network-accessible service to enable requested data to be transmitted in response by the first remote network-accessible service to the configured computing system without being forwarded through at least one of the other local devices.

34. The non-transitory computer-readable storage medium of claim 14 wherein the stored contents include software instructions that, when executed, program the configured computing system, and wherein the computer-readable storage medium includes one or more memories of one or more devices.

* * * * *

UNITED STATES PATENT AND TRADEMARK OFFICE
CERTIFICATE OF CORRECTION

| | | |
|---|---|---|
| PATENT NO. | : 8,903,938 B2 | Page 1 of 1 |
| APPLICATION NO. | : 11/764763 | |
| DATED | : December 2, 2014 | |
| INVENTOR(S) | : Allan H. Vermeulen et al. | |

It is certified that error appears in the above-identified patent and that said Letters Patent is hereby corrected as shown below:

In the Claims

Column 17, Line 55:
"service over the One or more intervening computer" should read, --service over the one or more intervening computer--.

Column 18, Line 38:
"the obtained locators references." should read, --the obtained locator references.--.

Signed and Sealed this
Twenty-first Day of April, 2015

Michelle K. Lee
*Director of the United States Patent and Trademark Office*